US009935928B2

(12) United States Patent
Brown

(10) Patent No.: US 9,935,928 B2
(45) Date of Patent: Apr. 3, 2018

(54) METHOD AND APPARATUS FOR AUTOMATED PASSWORD ENTRY

(71) Applicant: Wendell D. Brown, Henderson, NV (US)

(72) Inventor: Wendell D. Brown, Henderson, NV (US)

(73) Assignee: Wendell D. Brown, Henderson, NV (US)

( * ) Notice: Subject to any disclaimer, the term of this patent is extended or adjusted under 35 U.S.C. 154(b) by 0 days.

(21) Appl. No.: 15/387,438

(22) Filed: Dec. 21, 2016

(65) Prior Publication Data

US 2017/0104738 A1 Apr. 13, 2017

Related U.S. Application Data

(63) Continuation of application No. 14/226,406, filed on Mar. 26, 2014, now Pat. No. 9,565,181.

(60) Provisional application No. 61/806,061, filed on Mar. 28, 2013.

(51) Int. Cl.
*H04L 29/06* (2006.01)

(52) U.S. Cl.
CPC .......... *H04L 63/062* (2013.01); *H04L 63/083* (2013.01); *H04L 63/10* (2013.01)

(58) Field of Classification Search
CPC ...... H04L 63/062; H04L 63/10; H04L 63/083
See application file for complete search history.

(56) References Cited

U.S. PATENT DOCUMENTS

| 6,000,033 | A | * | 12/1999 | Kelley | G06F 21/31 709/225 |
|---|---|---|---|---|---|
| 6,993,658 | B1 | * | 1/2006 | Engberg | G06F 21/43 379/114.2 |
| 7,155,739 | B2 | | 12/2006 | Bari et al. | |
| 7,325,065 | B1 | * | 1/2008 | Watkins | H04L 63/083 709/224 |
| 7,519,987 | B1 | | 4/2009 | Holt et al. | |

(Continued)

FOREIGN PATENT DOCUMENTS

WO 2014124710 A1 8/2014

OTHER PUBLICATIONS

"Password Safe", Mar. 15, 2009, retrieved online from <https://web.archive.org/web/20090315024234/https://pwsafe.org/>, retrieved on Sep. 29, 2017.*

(Continued)

*Primary Examiner* — Farid Homayounmehr
*Assistant Examiner* — Zhimei Zhu
(74) *Attorney, Agent, or Firm* — Park, Vaughan, Fleming & Dowler LLP

(57) ABSTRACT

A method and apparatus are provided for protecting security credentials (e.g., username/password combinations) and/or other sensitive data in a "password vault." A password vault device may be or may be incorporated into a portable (or even wearable) electronic device, such as a smart phone, smart watch, smart glasses, etc. When a security credential is requested during a user's operation of the password vault device or some other computing/communication device, such as when the user is accessing an online site or service via a browser program, the request is passed to the password vault, and the appropriate security credential is retrieved, delivered, and entered into the requesting interface.

23 Claims, 3 Drawing Sheets

(56) References Cited

U.S. PATENT DOCUMENTS

| | | | |
|---|---|---|---|
| 8,443,425 B1 | 5/2013 | Evans et al. | |
| 8,910,256 B2* | 12/2014 | Sharif | G06F 21/31 713/185 |
| 9,077,544 B2* | 7/2015 | Baker | H04W 12/06 |
| 9,262,592 B2* | 2/2016 | Schrecker | G06F 21/00 |
| 9,305,149 B2 | 4/2016 | Grigg | |
| 9,756,031 B1* | 9/2017 | Roth | H04L 63/08 |
| 2002/0023059 A1* | 2/2002 | Bari | G06F 21/41 705/76 |
| 2002/0057678 A1 | 5/2002 | Jiang et al. | |
| 2003/0105864 A1 | 6/2003 | Mulligan et al. | |
| 2006/0242239 A1 | 10/2006 | Morishima et al. | |
| 2007/0016804 A1* | 1/2007 | Kemshall | G06F 21/34 713/193 |
| 2007/0074038 A1 | 3/2007 | Arenburg et al. | |
| 2007/0136573 A1* | 6/2007 | Steinberg | G06F 21/32 713/155 |
| 2007/0220270 A1* | 9/2007 | Murakami | G06F 21/35 713/183 |
| 2007/0261107 A1* | 11/2007 | Ng | H04L 63/062 726/5 |
| 2009/0217056 A1* | 8/2009 | Malpani | G06F 21/34 713/193 |
| 2009/0222908 A1 | 9/2009 | Warren | |
| 2009/0282258 A1* | 11/2009 | Burke | G06F 21/31 713/184 |
| 2009/0328169 A1 | 12/2009 | Hutchison et al. | |
| 2010/0192204 A1* | 7/2010 | Boulos | G06F 21/33 726/4 |
| 2010/0218241 A1* | 8/2010 | Faryna | G06F 21/35 726/5 |
| 2011/0029436 A1 | 2/2011 | Norvell et al. | |
| 2011/0106954 A1* | 5/2011 | Chatterjee | G06F 1/1632 709/227 |
| 2011/0307143 A1 | 12/2011 | Habaguchi et al. | |
| 2012/0167194 A1 | 6/2012 | Reese et al. | |
| 2012/0304302 A1 | 11/2012 | Stecher | |
| 2013/0014236 A1* | 1/2013 | Bingell | H04L 63/0846 726/6 |
| 2013/0080321 A1 | 3/2013 | Mulhall | |
| 2013/0145446 A1 | 6/2013 | Dorso et al. | |
| 2013/0198824 A1* | 8/2013 | Hitchcock | G06F 21/00 726/6 |
| 2013/0205360 A1* | 8/2013 | Novak | H04L 63/102 726/1 |
| 2014/0188398 A1 | 7/2014 | Cohen et al. | |
| 2014/0208112 A1* | 7/2014 | McDonald | H04W 12/04 713/171 |
| 2014/0237564 A1 | 8/2014 | Dudziak et al. | |
| 2014/0283065 A1 | 9/2014 | Teddy et al. | |
| 2014/0289870 A1 | 9/2014 | Selander et al. | |
| 2014/0317708 A1* | 10/2014 | Adrangi | H04B 5/00 726/7 |
| 2014/0331286 A1* | 11/2014 | Davis | G07C 9/00031 726/4 |
| 2014/0378100 A1 | 12/2014 | Ding et al. | |
| 2015/0081559 A1* | 3/2015 | Dua | G06Q 20/20 705/44 |
| 2015/0187151 A1* | 7/2015 | Lagerstedt | G07C 9/00103 340/5.61 |
| 2015/0281211 A1* | 10/2015 | Josang | H04L 63/083 726/5 |
| 2015/0326556 A1* | 11/2015 | Vadura | H04L 63/0815 726/4 |

OTHER PUBLICATIONS

Tom Simote, "To Keep Passwords Safe from Hackers, Just Break Them into Bits", Oct. 9, 2012, MIT Technology Review, obtained online, <https://www.technologyreview.com/s/429498/to-keep-passords-safe-from-hackers-just-break-them-into-bits/>, obtained on Oct. 13, 2016.

* cited by examiner

METHOD AND APPARATUS FOR AUTOMATED PASSWORD ENTRY

RELATED ART

This application is a continuation of co-pending U.S. patent application Ser. No. 14/226,406, filed Mar. 26, 2014, which claims priority to U.S. Provisional Application No. 61/806,061, which was filed Mar. 28, 2013 and is incorporated herein by reference.

BACKGROUND

This disclosure relates to the field of computer systems. More particularly, methods and apparatus are provided for retaining and automatically entering a login password or other security credential.

Username/password schemes are common methods of preventing unauthorized computer access, and require a valid user to enter an identifier (e.g., a username, an account number, an electronic mail address) and a security token associated with that identifier (e.g., a password, an access code, a personal identification number or PIN) before being granted the desired access. The user is expected to keep the credentials secret, or at least the security token.

As security threats continue to grow and evolve, so too has the sophistication of some username/password schemes. In particular, as more computer systems, data repositories, and other computing resources are hacked into or otherwise disrupted, organizations responsible for securing access to those resources (and other organizations having similar responsibilities) realize the need for tighter security.

One way of making access to their systems more secure is to place stricter requirements on user passwords, to decrease the likelihood of a malicious actor guessing a password or determining it through trial and error. For example, instead of simply enforcing some minimal length for a new password, tighter security schemes may require one or more of each of multiple different types or classes of characters (e.g., lower-case letter, upper-case letter, numeral, punctuation). In addition, users may be prompted or even required to change their passwords regularly (e.g., every month, every six months, every year), and may not be permitted to re-use a previous password. Further, users are warned not to use the same password for multiple systems, so that if one password is compromised the potential damage is limited.

As a result of increasingly stringent password requirements, users may be required or expected to remember numerous different and complex passwords without writing them down or otherwise making them easily available in a form that an eavesdropper or malicious actor could readily pilfer, observe, or intercept.

SUMMARY

In some embodiments, methods and apparatus are provided for creating, storing, managing, and/or automatically proffering a security credential on behalf of a user when the user is prompted to do so (e.g., to access a web site, online account, or other electronic system or resource). A requested credential may illustratively include an identifier (e.g., username, account number) and/or a token associated with that identifier (e.g., a password, an access code). The apparatus may comprise a portable or even wearable component, such as a smart phone, smart watch, smart glasses, and so on.

In some embodiments, the methods and apparatus may also store, manage, and/or automatically proffer other data that is best kept secure, such as a credit card number, a bank account number, a social security number, a billing address, answers to security questions, digital certificates, encryption keys, etc.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the invention or inventions associated with this disclosure are not intended to be limited to the embodiments shown, but rather is to be accorded the widest scope consistent with the disclosure.

In some embodiments of the invention, methods and apparatus are provided for creating, storing, managing, and/or automatically producing a security credential on behalf of a user when the user is prompted to do so to access a web site, online account, or other electronic system or resource.

In these embodiments, the apparatus is a portable device such as a smart phone, a watch, smart glasses, or other electronic device. The methods may include detecting a request for a security credential on a computing device (e.g., a laptop computer, a desktop computer) or the portable device itself, identifying the correct credential(s) (e.g., username/password), and inputting the correct credential(s) to the requesting application or service. The user may be notified of the request for a security credential, and may be asked or required to confirm that the request is valid, before it is delivered.

Figure 1:
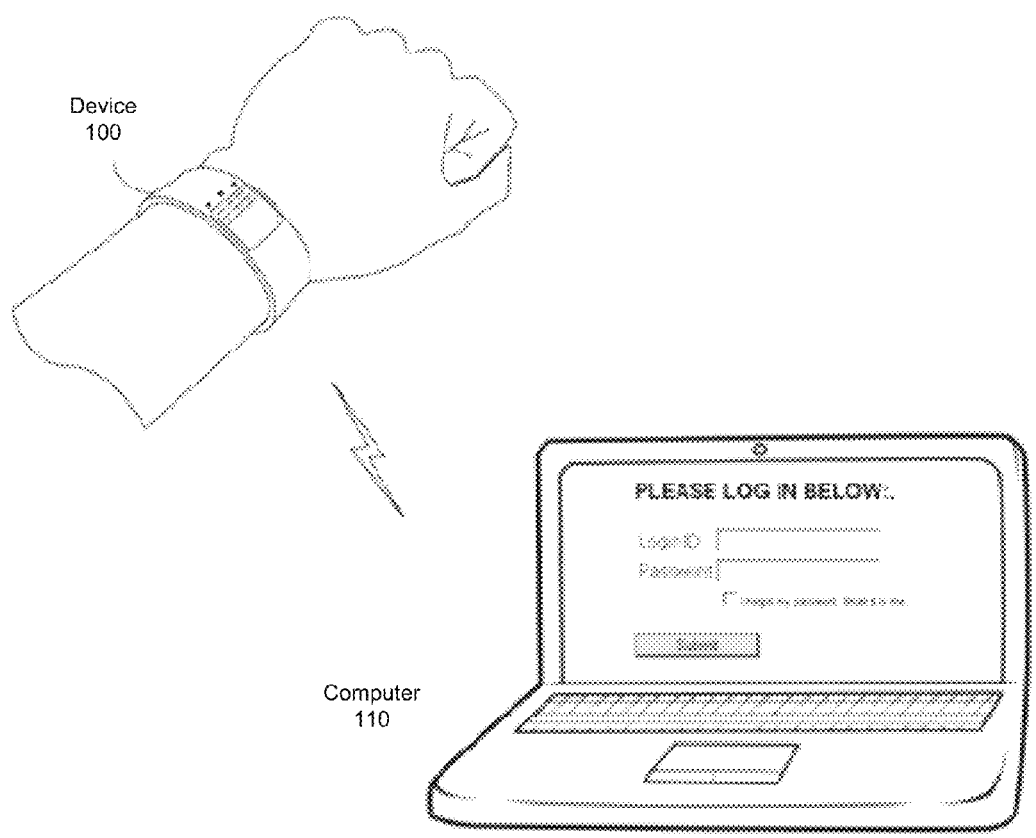
FIG. 1 is a block diagram depicting an environment in which a user's login credentials may be entered automatically, in accordance with some embodiments.

FIG. 1 is a block diagram depicting an environment in which a user's login credential(s) may be entered automatically, according to some embodiments. In these embodiments, a user operates computer 110 to access another computer system, a web site, or other application or service protected by a username/password scheme.

Device 100 comprises a "password vault" that stores the user's security credentials for the site or service being accessed on computer 110 (and/or others), receives notification of the request for a login ID and associated password, identifies the security credentials that correspond to the site or service, and automatically inputs them. A password vault may alternatively be termed a security credential vault, a credential repository, or something similar, and may be just one of multiple features of the device (in additional to keeping time, making/receiving calls, etc.).

The password vault on device 100 may store any number of login credentials, and not just of the username/password variety, but also PINs, digital certificates, software keys, public/private encryption keys, and/or others. The vault may also store other data a user wishes to protect, such as credit card number/name, card security codes (CSC), card verification values (CVV), billing address, social security number, bank account numbers, hints for passwords or other security information, etc. These other data may also be entered automatically, or may be simply be reported to the user upon request.

In some embodiments, only a portion of a security credential (e.g., a password) may be stored in the vault, and the user must enter the remainder, or the device may automatically provide only a portion of the data and require the user to enter the remainder. This feature may help ensure that the password vault is being used by the true owner. For the same reason, use of the vault or access to information stored in the vault may require some action by the user that proves or makes it likely that the user is who he or she claims to be, as explained below.

Figure 2:
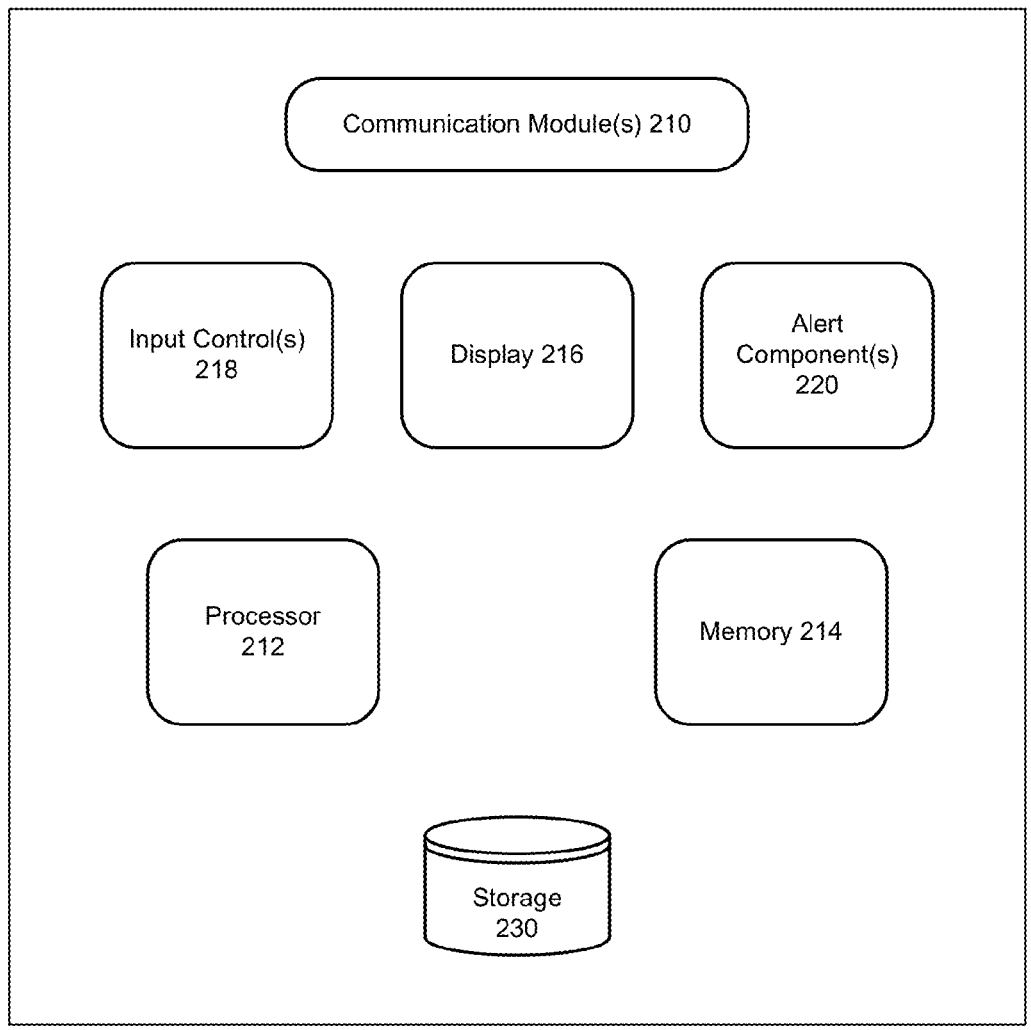
FIG. 2 is a block diagram of a password vault device, in accordance with some embodiments.

FIG. 2 is a block diagram of a password vault device, according to some embodiments. In the interest of simplicity, some components are omitted, such as a power source (e.g., a rechargeable battery), radio and antenna (if the device is or is part of a communication device), etc.

Password vault device 200 includes one or more communication modules 210 for communicating with external entities (e.g., a laptop computer, a mobile telephone network) via Bluetooth®, Wi-Fi®, and/or other wireless and/or wired communication technologies now known or hereafter developed. Different modules 210 may be implemented for different technologies.

Processor 212 controls operation of device 200, by executing logic stored in memory 214 and/or storage 230. Storage 230 may include one or more flash drives, solid-state drives, a magnetic or optical disk, and/or some other storage component(s).

Display 216 may provide information to a user via textual and/or graphical output, to indicate a status of the device, to verify an operation or user command, to provide the user with options (e.g., to select an appropriate set of login credentials to supply in response to a request), to aid in the creation or maintenance of security credentials, to deliver data secured by the vault, and/or for other purposes.

Input control(s) 218 may include buttons, switches, touch-sensitive components of display 216 (e.g., a virtual keyboard), a microphone for accepting verbal or aural input, a mini-keyboard, an accelerometer, etc. Alert component(s) 220 may include one or more light-emitting diodes (LEDs) or similar components, a speaker, a vibrating mechanism, and/or other components for alerting a user of some action or condition. Display 216 may be considered an alert component depending on the information it displays. One or more of display 216, input control(s) 218, and alert component(s) 220 are optional in some embodiments.

Also in some embodiments, the device may include a fingerprint reader, a retinal scanner, a heart-beat sensor, or some other biometric component for use in verifying the user's identity, and the user may be required to perform a scan (e.g., fingerprint, retina) to use the vault and/or on a periodic or random basis. Also, or instead, the user may be required to enter a security code (e.g., a password) into the device periodically or on a random basis (e.g., via an input control 218 or via a computing/communication device or other external entity coupled to the device via communication module(s) 210).

Other sensors may also, or instead, be included in a password vault device to recognize a legitimate user visually, such as with a facial pattern captured by a camera and analyzed by appropriate logic executed by processor 212. A "lock-out" mode could engage automatically if the device requests a facial scan and either none is offered or an incorrect pattern is detected, or if a sensor for detecting body heat, bodily proximity, or a heartbeat determines that the device has been removed from the (legitimate user's) body. A successful fingerprint scan, facial scan, password entry, or other verification could re-enable the device.

Storage 230 (and/or memory 214) may include specialized logic for execution by processor 212 to perform different functions, such as appropriate drivers for operating communication module(s) 210 and/or other components, logic for generating a new password and/or changing an existing password (e.g., according to specified constraints such as length, composition, and so on), storing/retrieving data to/from storage 230, maintaining security credentials (e.g., to locate a password to use for a given request), producing login credentials when requested, verifying a user's identity, etc. Data residing on storage 230 may be protected via encryption.

A request for a security credential (e.g., a username/password combination) may be received from an application interface, driver, web site plug-in, or other logic executing on an external device (e.g., computer 110 of FIG. 1) that requires the credential, or from logic operating on the same device (e.g., a smart phone) that incorporates password vault device 200. In response to the request, device 200 may transmit the credential in an encrypted or otherwise secured fashion, and the corresponding logic on the requesting device extracts and applies the credential. In some implementations, however, the security credential may be transmitted in the clear via near-field communications, radio-frequency communications, ultrasonic sound, or some other relatively short-distance communication scheme.

In some embodiments, a password vault device such as device 200 of FIG. 2 may be implemented as a small hardware component installed between a keyboard and a keyboard cable of a computing device operated by a user, as a network node plugged into a router, switch, or other component, or may be built into some other equipment, such as a keyboard, a computer mouse or other pointing device, a computer, a monitor or display, a mobile telephone, a smart watch, smart eyewear, etc.

Figure 3:
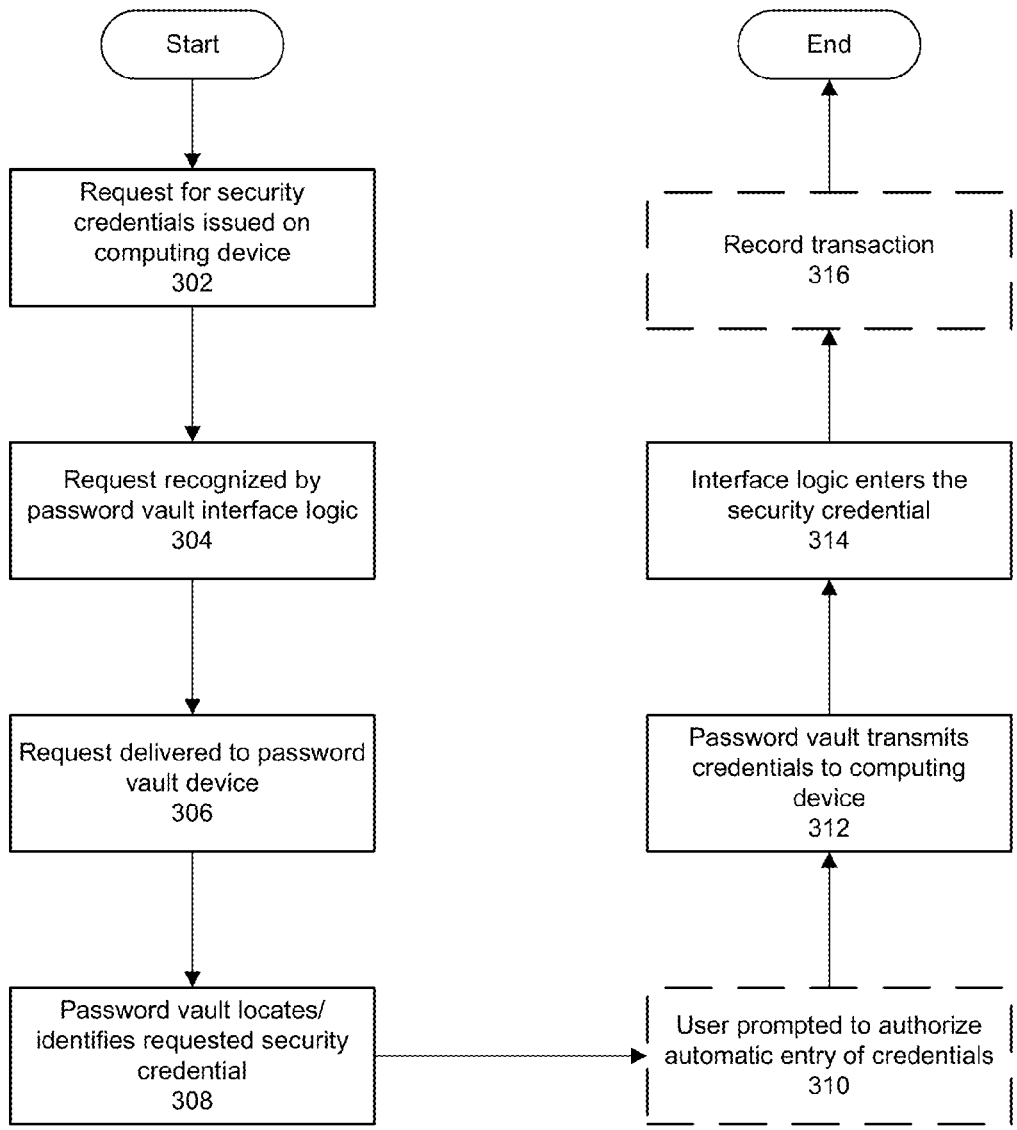
FIG. 3 is a flow chart demonstrating a method of automatically delivering a user's security credentials from a password vault on behalf of the user, in accordance with some embodiments.

FIG. 3 is a flow chart demonstrating a method of automatically delivering a user's security credentials from a password vault on behalf of the user, in accordance with some embodiments. In the illustrated method, the password vault is implemented within or as a wearable electronic device (e.g., a smart watch, smart glasses such as Glass™ by Google Inc.) or a personal electronic device (e.g., a smart phone), but may be implemented in some other apparatus in other embodiments (e.g., as a subcutaneous RFID tag).

In operation 302, a request for a security credential of the user is issued on a computing device (e.g., a computer), communication device (e.g., a smart phone), or combined computing/communication device—which may be referred to herein as the "requesting device." For example, the request may be generated when the user navigates a browser to a secure application or service, when he attempts to open an application program secured with a password, etc. The security credential request is issued by the application, online service, data repository, or other electronic system, via a browser or other logic executing on the requesting device for the purpose of accessing the application, service, repository or other entity.

It should be noted that the requesting device may be a password vault device in some implementations. Further, the password vault device and the requesting device may be separate portable devices, or one or both may be stationary devices. Yet further, a single password vault device may serve multiple other devices to support entry of security credentials as needed.

In operation 304, the request is recognized by an agent, plug-in, add-on, or other interface logic that also executes on the requesting device. In some implementations, this interface logic is installed as part of the process of installing and configuring the user's password vault. In other implementations, the interface logic is built into the application, online service, data repository, or other server-side logic executed by the electronic system being accessed by the user, or is built into the browser or other logic that is being used to access the application, online service, data repository, or other electronic system.

For example, when visiting a web page that requests the security credentials, the user's browser may recognize the Hypertext Markup Language (HTML) that it processes as comprising the request, because the browser has been enhanced with the interface logic. Or, the page that is received by the requesting device from a remote system may include the interface logic.

In some implementations, a site or service that supports operation of a password vault may incorporate a suitable logo or mark into a user interface (e.g., a login screen). This logo or mark would then be recognized by the interface logic, and may include or be accompanied by any special instructions (e.g., to identify the necessary security credential).

In some other implementations, a request for a security credential may be captured by a camera that is coupled to the password vault and that passes imagery to the password vault (or other entity) for processing. The request for a security credential could then be recognized when the imagery is processed in real-time. Such a camera could also, or instead, be used to capture which login ID or other identifier is entered for a particular site (which may be identified by a URL or the appearance of the login interface). Subsequently, when the user again visits that site the password vault could automatically enter the identifier (and the password if it has been stored in the vault).

In operation 306, the interface logic communicates the request for security credentials to the password vault via any suitable communication protocol or interface language. For example, interaction between the computing/communication device and the password vault device may be via Wi-Fi, Bluetooth, RF, an optical link, etc.

The request provides sufficient information to allow the password vault to identify the specific security credential(s) that is/are requested. For example, the request may include the specific name of a digital certificate, may provide the URL (Universal Resource Locator) or other identifier of the electronic system that requires the credential, may include a username or login ID of the credential if that information was automatically populated in the request (e.g., because the user selected a "Remember Me" option during a previous login), etc.

In operation 308, the password vault locates the requested security credential (e.g., username/password combination, digital certificate, security question answer(s)). If the requested credential cannot be found, the method may end with a suitable notification to the user (e.g., a textual alert on a display component of the password vault device, a specific pattern of visual or audible signals, a pop-up on the requesting system). As discussed further below, if and when the user manually enters the security credential, the password vault may obtain and store it if it is not already stored. If the vault successfully locates the requested security credential, the method continues at operation 310.

In optional operation 310, the password vault prompts the user to approve automatic entry of the security credential. This option may be one of any number of operational parameters of the password vault that the user may configure and re-configure as desired. The prompt may be textual, audible, visual, tactile (e.g., via a vibration mechanism), or some combination of these. Similarly, the user's response may be provided via a physical input control (e.g., a button), via audio (e.g., a spoken command or sound), tactile (e.g., shaking the password vault device), or some combination of these. A first response (or no response) may mean one thing (e.g., approval of automatic entry request), while a second response (or no response) may mean something else (e.g., denial of automatic entry request).

Illustratively, if the password vault prompts the user to authorize automatic entry of a security credential, but the user is not currently attempting to access any electronic system that requires a credential, he or she is alerted to a possible attempt to steal his credentials. By denying authorization to transmit the credentials, they will not be compromised. When it requests authorization, the password vault may display (e.g., on a display component) a URL, a name of the site or service, a nickname assigned by the user to the site or service, or some other information that identifies which credential(s) is or are to be transmitted upon approval.

Assuming the user approves the entry request in operation 310, the method continues with operation 312.

In operation 312, the password vault transmits the security credential to the requesting device (e.g., the interface logic), via the same communication means used in operation 306 or some other link.

In operation 314, the interface logic receives the security credential, decrypts it if necessary, and enters it appropriately. The interface logic may also take the necessary action to proceed (e.g., activating a "Submit" or "Continue") control associated with the request, or this action may be left to the user.

In optional operation 316, the password vault may record the transaction locally (i.e., within the vault) or remotely (e.g., on the requesting device, at a central online service). The recorded transaction may identify the system, site, or service that was accessed, the time, whether the user manually authorized the entry, and/or other information. After operation 316, the method ends.

In some implementations, the interface logic may enter only a portion of a password, and require the user to enter the first or last N characters (N≥1). Or, the interface logic may only display a hint associated with the password, thereby requiring the user to enter the full password.

In other implementations, part of a security credential (e.g., part of a password) may be delivered by one password vault, while another portion may be stored on and delivered by another password vault. Thus, a user may have complementary password vaults operating on different devices, and any requested credential may be wholly entered by one vault, or partially entered by multiple different vaults. A vault may be stored online (e.g., "in the cloud").

In some embodiments, a password vault device may feature a mode of operation in which it generates or suggests a new password. For example, when a user of a password vault navigates a computing device to a new site or service, or must change an expired password, the user may activate this mode via a control that is part of the device, or by activating a software control offered by interface logic operating on the computing device, or the mode may be activated automatically if the interface logic recognizes what is requested.

Any requirements of or constraints on a new or replacement password may be identified by the user or may be detected automatically by the interface logic (e.g., by parsing textual instructions that accompany the request for creation of a password). The password vault may thus generate a suggested password that meets the specified requirements, optionally display it to the user via the interface logic or a display component of the password vault device, and automatically enter it if the user approves.

Yet further, a password vault may be programmed or instructed to update/change all or selected credentials (e.g., passwords) on a manual or periodic/scheduled basis. The vault would automatically connect to the corresponding systems (e.g., through interface logic on a trusted computing device, if necessary), update the passwords (e.g., through learned or programmed behavior), and store the new passwords (which may or may not be displayed for the user).

In some embodiments, some or all of a password vault's stored data may be backed up to a computing device that is local or remote (e.g., in the cloud in an online storage locker), a portable storage component (e.g., a USB memory stick), or some other entity, either manually by a user or automatically, and on a periodic basis or request-by-request.

In some embodiments, use of a password vault, or delivery of one or more specified security credentials from the vault, may be geographically locked or fenced. In these embodiments, unless the user is within a corresponding geographical area, the vault will not transmit any security credentials, or at least not those that have been geographically locked.

An illustrative lock may be associated with the user's computing device at home or in an office, for example. Unless he or she is within some distance of that device (e.g., within range of wireless communications), the vault will not divulge a credential that has been tied to that device. Distance may be determined by a received signal strength indication (or RSSI) regarding communications exchanged between the password vault device and the computing device or other associated device (e.g., a wireless access point), by a GPS component, through radio frequency identification (RFID) technology, or in some other way.

Similarly, a password vault or some data stored by a vault may be automatically disabled based on a time of day (of the vault, of a computing/communication device into which the vault automatically enters security credentials), may be manually turned on or off by a user, may be disabled when a specified computing/communication device of the user is hibernating or in a "sleep" mode (presumably, any request purporting to emanate from the device during that time is fraudulent). Or, a vault or data secured in a vault may be automatically enabled or disabled based on other external conditions, such as whether the computing/communication device's mouse (or keyboard or other input component) is awake, whether a motion sensor detects motion (e.g., by the user), whether the lights are on or off in the user's office or home, etc.

A user may be able to remotely enable or disable a password vault or password vault device, from a computing or communication device that is suitably configured. For example, the vault may be registered with a central web site, and the user may log into the site from the computing/communication device to enable or disable the vault as desired. Such activation/deactivation could be complete or partial, to allow some security credentials to be released, but not others, for example, to store new credentials, delete existing ones, or take other action (e.g., set configurable operational parameters).

A central password vault service may also record transactions, to show what security credentials were requested of and delivered by which vault(s), when, where the user/vault was located, what site or service requested the credentials, any errors that occurred, etc. The central service may also allow the user to set pre-approved credential deliveries to do not require real-time approval by the user. For example, the user may specify that any request from one or more specified sites may be automatically satisfied without separate acknowledgement by the user if the request is received between certain times, on certain computing/communication devices, etc.

In some embodiments, templates relating to sites, services, and/or other systems for which security credentials may be requested of a password vault user may also be stored, in the vault or on a computing/communication device used to access the systems. Such a template may identify the information needed on one or more pages or interfaces presented to the user by a system. For example, a template associated with a web-based electronic mail system may indicate that first a username (e-mail address) must be entered, followed by a tab character, then the corresponding password, then another tab, enter "x" or space to check a box, then enter a return character. A given template may be identified by a name of the system, a URL of the page that corresponds to the template, etc.

In some embodiments, data stored in a password vault may be segregated into any number of categories or types having separate restrictions. For example, security credentials may be categorized as "family," "private," "work," and so on. Illustratively, security credentials categorized as "work" may only be delivered to a user's work computer. This would also require some categorization of the user's different requesting devices.

An environment in which some embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory, non-volatile memory, magnetic and optical storage devices such as disk drives, magnetic tape, CDs (compact discs) and DVDs (digital versatile discs or digital video discs), solid-state drives and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method of operating a portable credential vault device, the method comprising:
   storing at the credential vault device multiple security credentials of a user and information identifying remote computer systems associated with the security credentials; and
   operating a processor of the credential vault device to, without activity by the user:
      categorize the multiple security credentials based on input from the user;
      receive a request to generate a new password for accessing a first remote computer system;
      determine a category of the first remote computer system;
      generate the new password;
      during operation by the user of an electronic device to access the first remote computer system, receive from the electronic device a request for a first security credential associated with the first remote computer system, wherein the first security credential comprises the new password;
      automatically deliver only a first portion of the first security credential to the electronic device in response to the request for the first security credential; and
      prior to delivering the first portion of the first security credential, verify that the category of the first remote computer system matches the category of the first security credential;
      wherein the user enters a remaining portion of the first security credential at the electronic device.

2. The method of claim 1, wherein the request to generate a new password is received during the user's operation of the electronic device.

3. The method of claim 1, wherein the request to generate a new password is received from the electronic device when the user is not operating the electronic device.

4. The method of claim 1, wherein the request to generate a new password is received from the first remote computer system.

5. The method of claim 1, further comprising operating the processor to, prior to automatically delivering the first portion of the first security credential:
   alert the user to the request for the first security credential; and
   receive from the user input signifying authorization of delivery of the first portion of the first security credential.

6. The method of claim 5, wherein the alert is configured to identify one or more of the first security credential and the first remote computer system.

7. The method of claim 1, further comprising operating the processor to:
   temporarily disable delivery of one or more stored security credentials to a requesting device unless the credential vault device is located proximate to the requesting device.

8. The method of claim 1, further comprising operating the processor to:
   disable delivery of one or more stored security credentials during a predetermined period of time.

9. The method of claim 1, wherein the electronic device is one of:
   a computing device; and
   a communication device comprising a processor.

10. A non-transitory computer-readable medium storing instructions that, when executed by a processor, cause the processor to perform a method of operating a portable credential vault device, the method comprising:
    storing at the credential vault device multiple security credentials of a user and information identifying remote computer systems associated with the security credentials; and
    operating a processor of the credential vault device to, without activity by the user:
       categorize the multiple security credentials based on input from the user;
       receive a request to generate a new password for accessing a first remote computer system;
       determine a category of the first remote computer system;
       generate the new password;
       during operation by the user of an electronic device to access the first remote computer system, receive from the electronic device a request for a first security credential associated with the first remote computer system, wherein the first security credential comprises the new password;
       automatically deliver only a first portion of the first security credential to the electronic device in response to the request for the first security credential; and
       prior to delivering the first portion of the first security credential, verify that the category of the first remote computer system matches the category of the first security credential;
       wherein the user enters a remaining portion of the first security credential at the electronic device.

11. The non-transitory computer-readable medium of claim 10, wherein the request to generate a new password is received from the electronic device when the user is not operating the electronic device.

12. The non-transitory computer-readable medium of claim 10, wherein the method further comprises operating the processor of the credential vault device to:
    alert the user to the request for the first security credential; and receive from the user input signifying authorization of delivery of the first portion of the first security credential.

13. The non-transitory computer-readable medium of claim 10, wherein the method further comprises operating the processor of the credential vault device to:

temporarily disable delivery of one or more stored security credentials to a requesting device unless the credential vault device is located proximate to the requesting device.

14. The non-transitory computer-readable medium of claim 10, wherein the method further comprises operating the processor of the credential vault device to:

disable delivery of one or more stored security credentials during a predetermined period of time.

15. A portable credential vault device, comprising:

at least one processor;

one or more communication modules operable to facilitate electronic communication between the credential vault device and at least one external device;

non-transitory storage for storing multiple security credentials of a user and information identifying remote computer systems associated with the security credentials; and memory storing instructions that, when executed by the at least one processor, cause the credential vault device to, without activity by the user:

categorize the multiple security credentials based on input from the user;

receive a request to generate a new password for accessing a first remote computer system;

determine a category of the first remote computer system;

generate the new password;

during operation by the user of an electronic device to access the first remote computer system, receive from the electronic device a request for a first security credential associated with the first remote computer system, wherein the first security credential comprises the new password;

automatically deliver only a first portion of the first security credential to the electronic device in response to the request for the first security credential; and prior to delivering the first portion of the first security credential, verify that the category of the first remote computer system matches the category of the first security credential;

wherein the user enters a remaining portion of the first security credential at the electronic device.

16. The credential vault device of claim 15, wherein the request to generate a new password is received during the user's operation of the electronic device.

17. The credential vault device of claim 15, wherein the request to generate a new password is received from the electronic device when the user is not operating the electronic device.

18. The credential vault device of claim 15, wherein the request to generate a new password is received from the first remote computer system.

19. The credential vault device of claim 15, wherein the memory further stores instructions that, when executed by the at least one processor, cause the credential vault device to, prior to automatically delivering the first portion of the first security credential:

alert the user to the request for the first security credential; and receive from the user input signifying authorization of delivery of the first portion of the first security credential.

20. The credential vault device of claim 19, wherein the alert is configured to identify one or more of the first security credential and the first remote computer system.

21. The credential vault device of claim 15, wherein the memory further stores instructions that, when executed by the at least one processor, cause the credential vault device to:

temporarily disable delivery of one or more stored security credentials to a requesting device unless the credential vault device is located proximate to the requesting device.

22. The credential vault device of claim 15, wherein the memory further stores instructions that, when executed by the at least one processor, cause the credential vault device to:

disable delivery of one or more stored security credentials during a predetermined period of time.

23. The credential vault device of claim 15, wherein the credential vault device is wearable.

* * * * *